United States Patent [19]

Kasuya

[11] Patent Number: 5,158,634
[45] Date of Patent: Oct. 27, 1992

[54] METHOD OF ASSEMBLING A VEHICLE SEAT

[75] Inventor: Takashi Kasuya, Akishima, Japan

[73] Assignee: Tachi-S Co. Ltd., Akishima, Japan

[21] Appl. No.: 686,157

[22] Filed: Apr. 16, 1991

[51] Int. Cl.⁵ .................... B32B 3/30; B32B 31/04
[52] U.S. Cl. .................................. 156/212; 156/213; 156/214; 156/245; 156/293; 156/303.1; 264/46.7; 297/DIG. 1
[58] Field of Search ............... 156/212, 213, 214, 92, 156/78, 303.1, 293, 285, 93, 245; 297/DIG. 1, DIG. 2; 264/46.7

[56] References Cited

U.S. PATENT DOCUMENTS

| | | | |
|---|---|---|---|
| 2,703,603 | 3/1955 | Endicott | 297/DIG. 1 X |
| 4,609,226 | 9/1986 | Yoshizawa | 297/DIG. 1 X |
| 4,656,086 | 4/1987 | Bowers et al. | 264/46.7 X |
| 4,699,427 | 10/1987 | Kobayashi | 297/DIG. 1 X |
| 4,840,430 | 6/1989 | Shimada | 156/212 X |
| 4,929,304 | 5/1990 | Urai et al. | 156/285 X |
| 5,000,515 | 3/1991 | Deview | 297/DIG. 1 X |

Primary Examiner—Michael W. Ball
Assistant Examiner—Michele K. Yoder
Attorney, Agent, or Firm—Oldham, Oldham & Wilson Co.

[57] ABSTRACT

A method of assembling a vehicle seat by bonding adhesively a trim cover assembly to a preformed foam cushion member. In the assemblage, a location board having a serrated part on its side is sewn to the trim cover assembly such that the serrated part projects from the reverse surface of cover assembly, and such assembly is turned over and placed on a lower die having a location groove which includes a vertically curved part. The location board is fitted and bent vertically along such location groove, which permits bonding of the cover assembly neatly over the uneven surface of cushion member, without slack and wrinkles, when pressing the cushion member against the cover assembly by means of an upper die.

5 Claims, 4 Drawing Sheets

METHOD OF ASSEMBLING A VEHICLE SEAT

BACKGROUND OF THE INVENTION

1. Field of the Invention

The present invention relates to a method of assembling a vehicle seat such as an automotive seat, and in particular to the seat assembling method in which a foam cushion member is formed in a mold and then a trim cover assembly is bonded by adhesive to the cushion member.

2. Description of Prior Art

Among various seat assembling methods, there has been known a method utilizing a location board to precisely bond a trim cover assembly over a foam cushion member. The location board is sewn together with the trim cover assembly at its juncture points, such that the board stands vertically such as to be engaged into recessed grooves of cushion member at upper die side and those of lower die. Specifically, a conventional example of such seat assembling method is shown FIGS. 1, 2 and 3.

As shown in FIG. 1, there are provided an upper die (U') and a lower die (L') such that the upper die (U') is movable vertically toward and away from the lower die (L') At the upper die (U'), a foam cushion member (P') is secured, which is pre-formed by a foaming process using a mold in a predetermined shape of seat cushion; namely, a seat cushion body having, formed therein, a pair of lateral raised portions (33')(33') (i.e. bolster portions) and a flat central seating portion (34') defined between the two lateral raised portions (33')(33'). At respective boundaries between the central and lateral raised portions (33')(33'), recessed grooves (32)(32) are formed for a purpose to be set forth later. On the other hand, a trim cover assembly (C') is turned upside down and placed upon the lower die (L') having a working surface contoured in a shape conforming to the foregoing outer shape of cushion member (P'). The trim cover assembly (C') is composed of a central cover section (11') and a pair of lateral cover sections (12')(12'). The lateral cover sections (12') are at their one ends sewn to both lateral ends of central cover section (11'), respectively, via two location boards (2)(2) as shown in FIG. 2. Although not clearly shown, each of the location boards (2) (2) is formed in a long tape-like strip manner, and made of a hard synthetic material.

Looking again at FIG. 2, one end, as designated by (12'a), of the lateral cover section (12') and one end, as designated by (11'a), of central cover section (11') are shown as sandwiching the first half (22) of location board (2) and being sewn by threads (41) to the respective opposite surfaces of the board (2), while another second half (21) of board (2) is inserted in the location groove (33) formed in the lower die (L'). Hence, the location board (2) is fixed along the boundary line between the central and lateral cover sections (11')(12'), and erected there vertically at a right angle relative to surface of the lower die (L'). FIG. 2 is a view to enlarge the portion encircled by designation (A), showing only left-side juncture between the two cover sections (11')(12') but it should be understood that another right-side juncture is constructed as such, as viewed from FIG. 1. Therefore, a pair of location boards (2) are disposed upon the lower die (L') as seen in FIG. 2, such that the first halves (22) of the boards (2) project upwardly while the second halves (21) thereof project down and rest within the respective location grooves (33) of lower die (L'). With the boards (2)(2) set as such upon the lower die (L'), the trim cover assembly (C') is secured on the same die, as in FIG. 1, the upper die (U') is lowered towards the lower die (L') to pressingly bond the cushion member (P') to the rear surface of trim cover assembly (C'). At this point, the upper first halves (22) of location boards (2), with the juncture part (i.e. 11'a, 12'a) or trim cover assembly (C') sewn to those first halves (22), are respectively inserted and bonded in the two recessed grooves (32)(32) of the cushion member (P'). After completion of such bonding, a bonded unit of cushion member (P') and trim cover assembly (C') are removed from the upper and lower dies (U')(L'). Then, as shown in FIG. 3, the second halves (22) of location boards (2), which project outwardly from the upper surface of trim cover assembly (C'), are cut off, as a result of which a seat is produced.

However, the location boards (2) are formed in a long strip form on a straight line, which means that the boards (2) are only effective for application to such seat cushion having the flat central portion (34') with the connection line or boundary line between the central and lateral cover sections (11)(12) extending straightly. As a consequence thereof, where the corresponding central seating portion of a cushion member is formed uneven or curved vertically in the seat cushion and the working surface of lower die is shaped conforming to such vertical curvature, then the straight location board is not deformed accordingly and if a trim cover assembly with such straight board is bonded to the cushion member by the lower die and upper die, the trim cover assembly is not wholly bonded over the cushion member, creating a floated non-bonded part or unpleasant wrinkles in the trim cover assembly.

SUMMARY OF THE INVENTION

With the above drawbacks in view, it is therefore a purpose of the present invention to provide a method for assembling a vehicle seat, which permits a location board to conform to an uneven surface of a cushion member for neatly bonding a trim cover assembly over the cushion member, without non-bonded part or wrinkles.

To achieve such purpose, according to the present invention, the seat assembling process involves forming a recessed groove in a preformed uneven cushion member along its contour, defining a vertically curved groove part at a vertically curved part of the cushion member; sewing a location board to a trim cover assembly along a sewing line, such that the board projects vertically through the trim cover assembly, defining a first board part projected from a reverse surface of the trim cover assembly and defining a second board part projected from a frontal surface of the same assembly, the board including a serrated area formed in the first board part; providing a lower die having a location groove formed therein, the location groove including a vertically curved groove area which is formed correspondingly to the vertically curved groove part of recessed groove, wherein the serrated area is defined at a location corresponding to such vertically curved groove area of the location groove; then, turning over and placing the trim cover assembly with the location board sewn thus thereto upon said lower die, while fitting said second board part of the location board into said location groove of the lower die, so that said location board stands vertically therein; then, by lowering the upper die to the lower one, bonding pressingly the cushion member to the reverse surface of trim cover assembly, in order that said first board part projected from said trim cover assembly is inserted and bonded in the recessed groove of the cushion member; removing a resulting bonded body of those cushion member and trim cover assembly from the upper and lower dies, wherein the second board is projected from the frontal surface of the trim cover assembly bonded over the cushion member, and thereafter, cutting away the second board part from the resulting bonded body, to thereby produce the seat.

Accordingly, the location board is vertically bendable by virtue of its serrated area to permit the trim cover assembly to be neatly spread over the lower die along its uneven surface, and thus the trim cover assembly can be bonded with the uneven surface of cushion member without slack non-bonded areas and wrinkles.

In another aspect of the invention, in addition to the serrated area, another serrated area is formed on another side of the location board opposite to the side with the first serrated area, so that a pair of serrated areas are each formed on respective both sides of location board.

In still another aspect of the invention, a thin region is formed on the side of location board opposite to the side with the first serrated area.

DETAILED DESCRIPTION OF PREFERRED EMBODIMENT OF THE INVENTION

Figure 1:
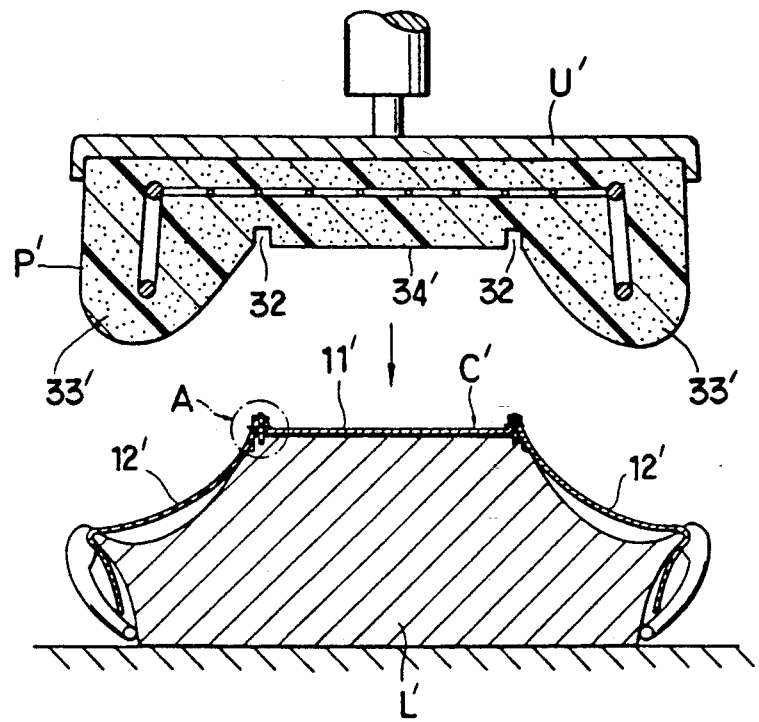
FIG. 1 is a sectional view which shows explanatorily a conventional method for assembling a vehicle seat.
Figure 2:
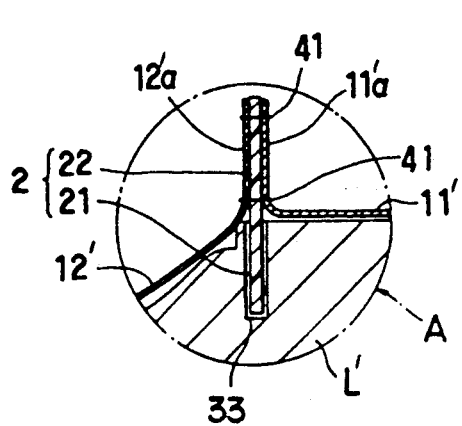
FIG. 2 is a view for partially enlarging the part A in the FIG. 1.
Figure 3:
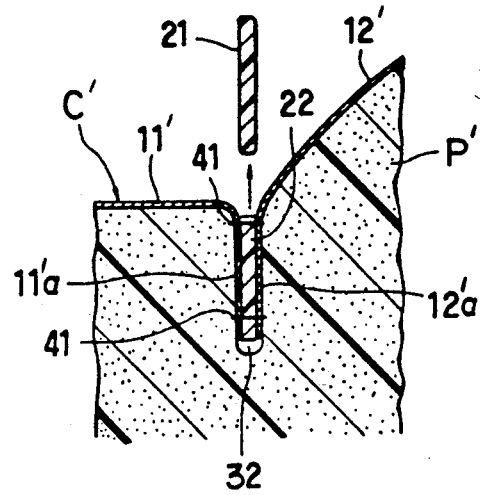
FIG. 3 is a partially sectional view of a resulting seat produced by the conventional method.
Figure 4:
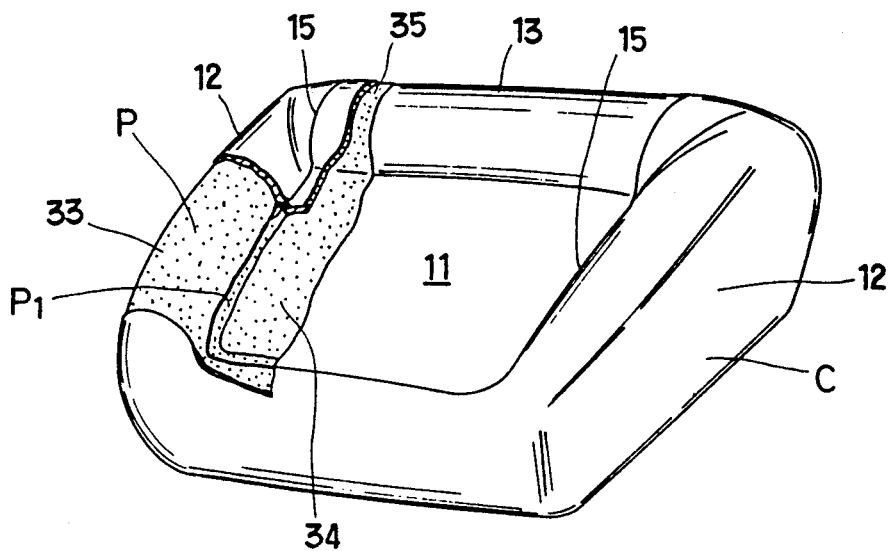
FIG. 4 is a partly broken perspective view of a resulting seat assembled in a method of the present invention.

Referring firstly to FIG. 4, a resultant seat cushion (SC) produced from a method in accordance with the present invention is illustrated, in which as different from the prior art seat cushion above, the seat cushion (SC) has a rear bolster portion (13) formed in its rear side. Namely, the seat cushion (SC) comprises a foam cushion member (P) which has been pre-formed by a foaming process, using a mold, into the shape of seat cushion, the cushion member (P) having such an uneven configuration formed by a flat central seating portion (34), a pair of raised lateral bolster portions (33) and a rear raised bolster portion (35) (see also FIG. 7), and a trim cover assembly (C) affixed adhesively over the cushion member (P) which consists of a central cover section (11), a pair of lateral cover sections (12)(12), a rear bolster cover section (13) continuous from the central cover section (11). Upon the cushion member (P), there is formed a U-shaped recessed groove (P1) such as to draw a contour line of the central seating portion (34), extending over the rear bolster portion (35), for a purpose to be set forth later. Along such recessed groove (P1), the central cover section (11) and lateral cover section (12), of the trim cover assembly (C), are connected together, as will be described later.

Figure 9:
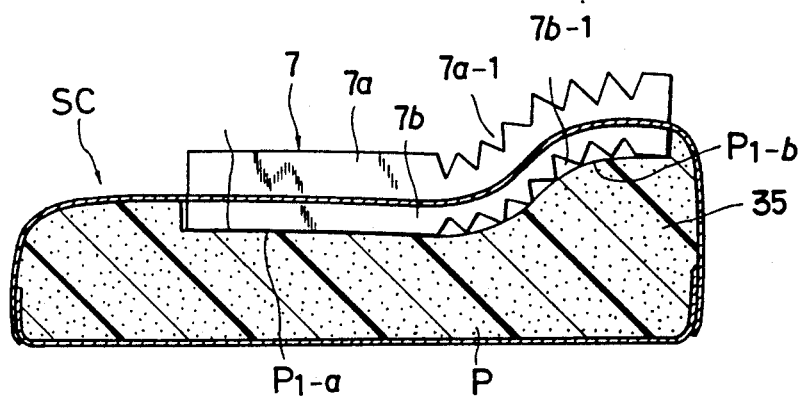
FIGS. 9 and 10 are sectional views of resulting seat assembled by the present invention method.

As shown, the rear bolster portion (35) has a cambered surface which is of a vertically curved contour in section as viewed from FIG. 9.

To assemble the above-described seat cushion (SC), description will now be made of a method as below.

Figure 6:
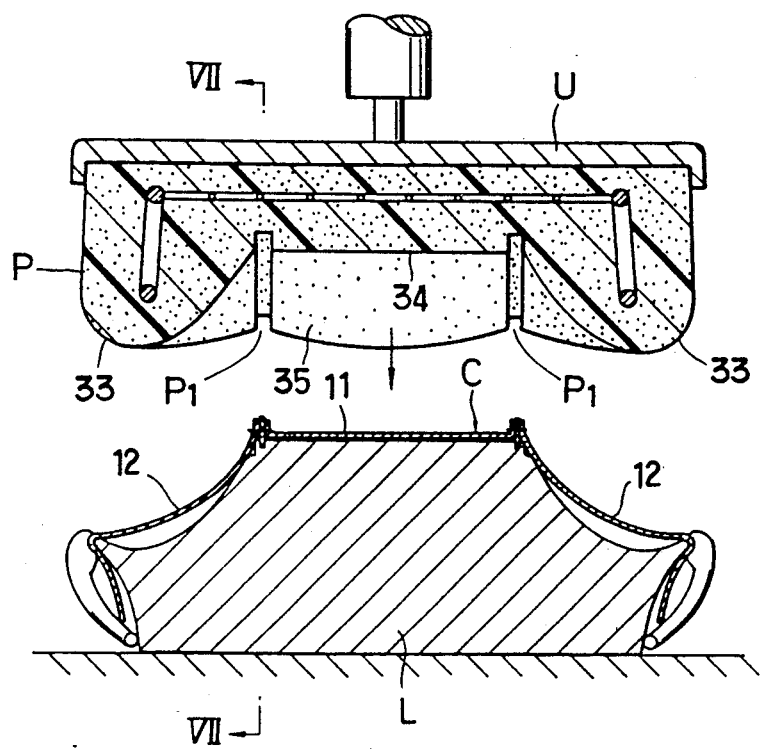
FIG. 6 is a sectional view showing explanatorily a seat assembling method in the present invention.
Figure 7:
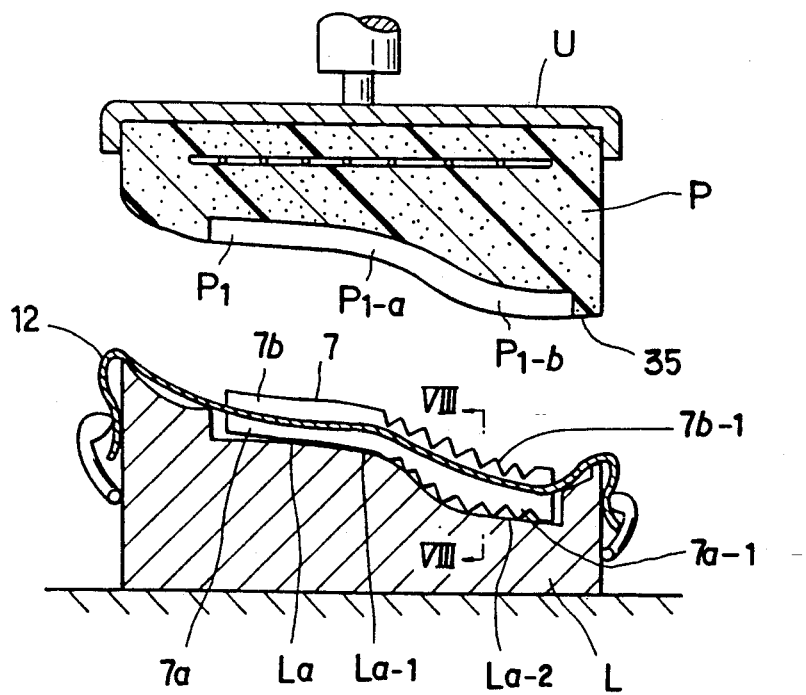
FIG. 7 is a sectional view taken along the line VII—VII in the FIG. 6.
Figure 8:
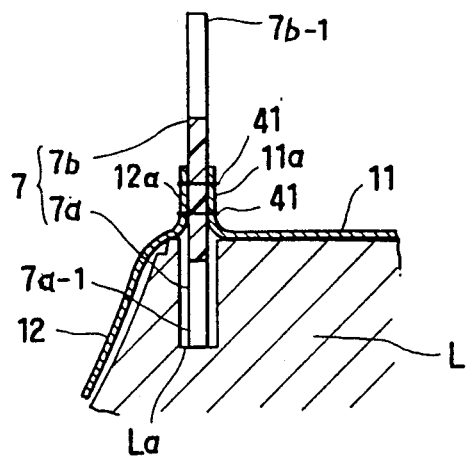
FIG. 8 is a sectional view taken along the line VIII—VIII in the FIG. 7.

Reference is made to FIGS. 6, 7 and 8, an upper die (U) and a lower die (L) are provided. The upper die (U) is movable vertically towards and away from the lower die (L). On the upper die (U), the above-mentioned foam cushion member (P) is secured at its flat bottom side, with the uneven surface thereof being oriented downwardly toward the lower die (L). On the other hand, the lower die (L) is fixed on a flat base, having a working surface formed in a shape conforming to the upper whole shape of the cushion member (P). Upon that lower die (L), the trim cover assembly (C) is secured and retained in a positive way ready for bonding with the cushion member (P).

According to the present invention, as can be seen from FIG. 8, a location groove (La) is formed on the lower die (L), substantially in conforming with the foregoing "U" shape of recessed groove (P1). This is a formation as viewed from above, though not shown, but, as viewed in longitudinal section in FIG. 7, taken along the lines VII—VII in FIG. 6, the location groove (La) conforms its formation along the flat area of the lower die (L) which corresponds to the flat central seating portion (34) of cushion member (P) and the vertically curved area of the same which corresponds to the cambered rear bolster portion (35) of cushion member (P). As designated by (La-1), the location groove (La) has a straight groove part defined correspondingly to that lower die flat area, whereas as designated by (La-2), the same groove (La) has a vertically curved groove part defined correspondingly to that lower die vertical curvature.

Likewise, in FIG. 7, having regard to the cushion member (P), the formation of its recessed groove (P1) defines a straight part (P1-a) corresponding to the flat central seating portion thereof and an upwardly curved part (P1-b) corresponding to the rear bolster portion (35) thereof.

The covering member (C) is provided with a location board (7) to be fitted into both foregoing recessed and location grooves (P1)(L1), for locating precisely, securely, the central, lateral and rear bolster cover sections (11)(12)(13) in correspondence with the mating three portions (34)(33)(35) of cushion member (P).

Figure 5:
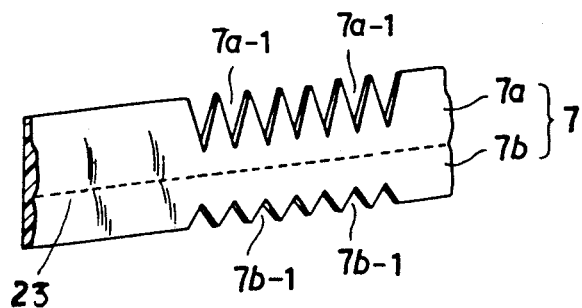
FIG. 5 is a partly broken perspective view, showing a first embodiment of location board.

The location board (7), as best shown in FIG. 5, is made of such a semi-hard synthetic resin as a nylon material and formed in a long strip shape having a perforation (23) dotted centrally, longitudinally of the board, with a first set of plural large serrations (7a-1) and a second set of plural small serrations formed symmetrically in relation to the perforation (23). The first and second sets of serrations (7a-1)(7b-1) are formed in the free end portion of the location board (7), as seen from FIGS. 7 and 9, thereby making bendable vertically, sinuously the location board (7) at that portion, as seen from FIGS. 7 and 9. Precisely stated, those serration sets (7a-1)(7b-1) are formed there at such length that they extend and rest along the foot of the rear bolster portion (35) of cushion member (P) up to the top thereof, as depicted in FIG. 9.

Figure 5A:
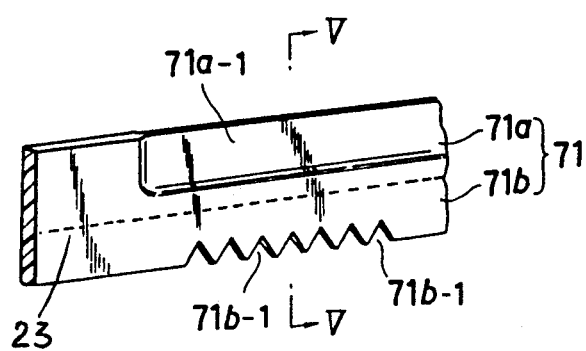
FIGS. 5(A) is a partly broken perspective view, showing a second embodiment of location board.
Figure 5B:
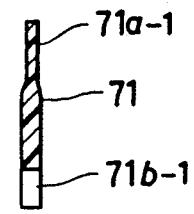
FIG. 5(B) is a sectional view taken along the line V—V in the FIG. 5(A)

FIGS. 5(A) and 5(B) show another embodiment of location board. According thereto, the location board, as designated by (71), similarly to that (7) of the above first embodiment, is made of a semi-hard synthetic resin and formed in a long strip shape having a perforation (23) dotted centrally, longitudinally of the board. But, by contrast, only one set of plural serrations (71b-1) is formed at a second half (71b) of the location board (71). The single set of serrations (71b-1) is to be inserted and fitted in the vertically curved groove part (P1-a) of recessed groove (P1). On the other hand, in the present embodiment, the other first half (71a) of location board (71) is formed with a thin region (71a-1). The thin region (71a-1) is defined along the longitudinal direction of the board (71), extending such as to cover whole of the serrations (71b-1). This formation of thin region (71a-1) assists in making more bendable the corresponding portion of location board (71), as similar to the first serration set (7a-1) of the above first embodiment.

It is noted that both two sorts of location boards (7)(71) should be made of a semi-hard synthetic resin material having a flexible expandability and elasticity for the foregoing vertically bendable purpose.

Referring to FIGS. 8 and 9, the location board (7) is sandwiched and fixed by the end (12a) of lateral cover section (12) and that (11a) of central cover section (11). In other words, the lateral cover section end (12a) and central cover section end (11a) are sewn to the opposite planar surfaces of location board (7) by threads (41)(41), using a suitable sewing machine (not shown). Though not clearly shown, as understandable from FIG. 4, the location board (7) is curved generally in a U-shaped configuration along the U-shaped connection line (15) between the central and lateral cover sections (12)(11), and thus the board (7) is formed with a pair of lateral board sections each having the serration sets (7a-1)(7b-1). Namely, a pair of serration sets (7a-1)(7b-1) are defined at the parts respectively of the lateral line sections of that connection line (15) which extend from the foot of the rear bolster cover section (13) up to the top thereof. Description will however be given in regard to only one lateral section of the location board (7) and thus only one of the pair of serration sets (7a-1)(7b-1), as the drawings show, for simplicity of description.

As shown in FIG. 5, the location board (7) has the first half (7a) and second half (7b) defined on the opposite sides and symmetrically relative to the perforation (23), with such an arrangement that the board (7) is sewn to the trim cover assembly (C), with the second half (7b) thereof projecting from the reverse side of the trim cover assembly (C) and the first half (7a) thereof projecting from the outer surface of the assembly (C), and as will become apparent, the first half (7a) is to be cut away from the second one (7b) along the perforation (23). It is noted here that both recessed groove (P1) and location groove (La) should be of a depth enough to fit receive therein the first and second halves (7a) (7b) of location board (7), respectively, during process for assembling the seat cushion (SC).

Now, the assemblage of the seat cushion (SC) consists in the following steps:

As shown in FIGS. 6 to 8, firstly the foam cushion member (P) is secured at its flat bottom side to the upper die (U), and the turned-over trim cover assembly (C) is placed on the lower die (L). At this stage, because of the reverse surface of trim cover assembly (7) facing outwardly upon the entire upper area of the lower die (L), the second half (7b) of location board (7) is exposed to project upwardly from the die (L) towards the cushion member (P) at the upper die (U), as in FIG. 7, while the first half (7a) is inserted in the location groove (La) of lower die (L). FIG. 7 shows that the second half (7a) of location board (7) rests along the straight part (La-1) and vertically curved part (La-2) of location groove (La): Namely, the straight part of the first half (7a) rests on the location groove straight part (La-1), whereas the serrated part (7a-1) thereof is downwardly bended or curved along the downward curvature of location groove vertically curved part (La-2) in cooperation with synchronized bending of the serrated part (7b-1) of second half (7b). Accordingly, it is to be appreciated that the trim cover assembly (C) spreads over and along the uneven surface of lower die (L) by such vertically flexible or bendable nature of paired serration sets (7a-1)(7b-1) of location board (7).

Then, an adhesive agent is applied to either the above-set reverse surface of trim cover assembly (C) or outer surface of cushion member (P).

Towards thus-located trim cover assembly (C) on the lower die (L), the upper die (U) is lowered, such that the projected second half (7b) is fitted into the recessed groove (P1) of cushion member (P). With further lowering of the upper die (U), the surface of cushion member (P) is pressed against the reverse surface of trim cover assembly (C), for effecting a bonding therebetween.

Figure 10:
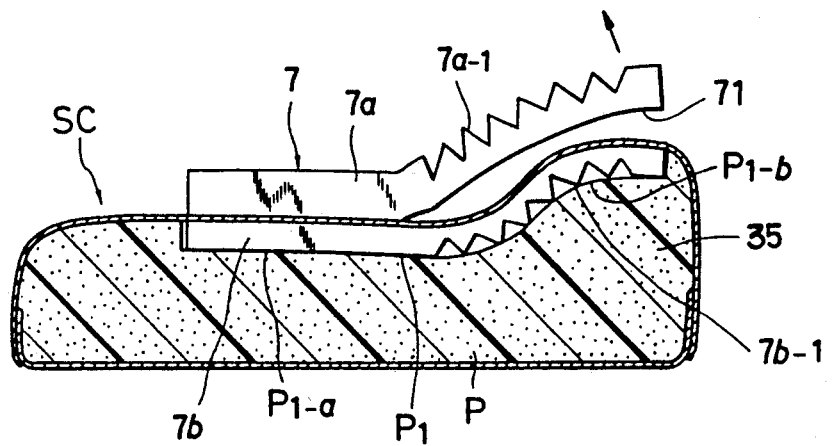

At the completion of such bonding, a bonded integral unit of cushion member (P) and trim cover assembly (C) is taken out of the lower die (L), and then, as illustrated in FIG. 9, the first half (7a) is exposed now to project upon the resultant seat cushion (SC). Such first half (7a) is cut away therefrom along the perforation (23) generally flush with connection line between the location board (7) and trim cover assembly (C), as indicated by the arrow in FIG. 10.

As a result, there is obtained such neatly finished product of seat cushion (SC) as in FIG. 4.

The same assembling procedures as above are also directly applied to the second embodiment of location board (71), in which case, the first half (71a) is to be cut away along the perforation (23) from the second one (71b).

In accordance with the present invention, the following novel features and advantages are found:

(i) The location board (7) is vertically bendable in a sinuous way due to its serrated parts (7a-1) (7b-1) to permit the trim cover assembly (C) sewn to the board to be neatly spread over the lower die (L) along its uneven surface. Thus, the trim cover assembly can be neatly bonded with the uneven surface of cushion member (C) without non-bonded slack areas and wrinkles.

(ii) Since the location board (7) is fitted between the recessed groove (P1) and location groove (La), the central cover section (11) circumscribed by the board (7), when pressed by the upper die (U), is given a uniform pressure and bonded to the cushion member (C) without creases. The same goes for both lateral cover sections (12)(12).

While having described the invention as above, it should be understood that the embodiments above are not restrictive for construction of the invention, but any other replacements, modifications and additions may structurally be possible without departing from the spirit and scope of the appended claims. The serration parts (7a-1)(7b-1) of the location board (7) are preferably formed in the embodiment shown, such that the first serration parts (7a-1) are formed with smaller spacing from one another so as to be more plural than the second serration parts (7b-1), but those two serration sets may be formed in any other manner so far as they facilitate the ease of vertical bendability of the location board (7).

What is claimed is:

1. A method for assembling a vehicle seat, comprising the steps of:
   (a) pre-forming a foam cushion member having a predetermined shape of said seat, through a foaming process using a mold, said cushion member including a vertically curved part;
   (b) forming a recessed groove in said cushion member, such as to extend along a contour of said cushion member, thus having a vertically curved groove part conforming to said vertically curved part of said cushion member;
   (c) providing a lower die which has a location groove formed therein, said location groove including a vertically curved groove area which is formed correspondingly to said vertically curved groove part of said recessed groove of said cushion member;
   (d) sewing a location board to a trim cover assembly along a sewing area, such that said location board projects vertically in relation to said sewing area, defining a second board part projected form a reverse surface of said trim cover assembly and defining a first board part projected from a frontal surface of said trim cover assembly, wherein said location board is made of a semi-hard material, and wherein said second board is formed with a serrated area defined at a location corresponding to said vertically curved groove area of said location groove, to thereby allow said location board to be bendable in the height-wise direction, whereas said first board part is provided with a means for rendering said location board bendable in its height-wise direction in cooperation with said serrated area of said second board part;
   (e) turning upside down and placing said trim cover assembly with said location board upon said lower die, while simultaneously fitting said first board part of said location board into said location groove of said lower die, so that said location board, by virtue of said serrated area of said second board part and said means for rendering said location board bendable, bends in the height-wise direction at said location corresponding to said vertically curved groove area, and said second board part of said location board is projected outwardly from said reverse surface of said trim cover assembly;
   (f) providing an upper die which is movable vertically toward and away from said lower die;
   (g) securing a foam cushion member on said upper die;
   (h) applying an adhesive agent to either of said reverse surface of said trim cover assembly and an outer surface of said cushion member;
   (i) lowering said upper die towards said lower die;
   (j) pressing and bonding said cushion member to said reverse surface of said trim cover assembly, in order that said second board part projected from said trim cover assembly is inserted in and along said recessed groove of said cushion, with said serrated area resting along said vertically curved groove part of said cushion member;
   (k) removing a resulting bonded body of said cushion member and trim cover assembly from said upper and lower dies, wherein said second board part is projected from said frontal surface of said trim cover assembly bonded over said cushion member; and
   (l) cutting away said second board part from said resulting bonded body, to thereby produce said seat.

2. The method as defined in claim 1, wherein said location board is made of a semi-hard synthetic resin material having an elastic and expandable property.

3. The method as defined in claim 1, wherein said means associated with said first board part of said location board comprises a serrated part formed similarly to that formed in said second board part, whereby a pair of serrated parts are formed on opposite sides of said location board.

4. The method as defined in claim 1, wherein said means associated with said first board part of said location board comprises a thin region. said location board is formed with a perforation dotted along its longitudinal direction to facilitate ease with which said second board part of said location board is cut away from said resulting bonded body.

5. The method as defined in claim 1, wherein said location board is formed with a perforation dotted along its longitudinal direction to facilitate ease with which said second board part of said location board is cut away from said resulting bonded body.

* * * * *